INVENTOR.
AMOS J. SHALER
BY
Brown, Critchlow, Flick & Peckham
ATTORNEYS.

INVENTOR.
AMOS J. SHALER
BY
Brown, Critchlow,
Flick & Peckham
ATTORNEYS.

United States Patent Office 3,453,978
Patented July 8, 1969

3,453,978
LOW-DRAG HULL STRUCTURE WITH EXTERIORLY HONEYCOMBED LOAD-BEARING SHELL FOR DEEP SUBMERGENCE VESSELS
Amos J. Shaler, State College, Pa., assignor to Stackpole Carbon Company, St. Marys, Pa., a corporation of Pennsylvania
Filed Feb. 2, 1967, Ser. No. 613,570
Int. Cl. B63b *3/13*
U.S. Cl. 114—16                    8 Claims

ABSTRACT OF THE DISCLOSURE

A deep sea submergence vessel has a hull with a honeycombed exterior surface. A porous skin covers the exterior surface to reduce the drag of the vessel as it moves through the water. The surrounding liquid permeates through the skin.

---

This invention relates to a hull structure for vessels intended to be subjected to extremely high external fluid pressure, such as, for example, submergence vessels for exploring the ocean depths, and more particularly to such structures having a load-bearing shell, the outer surface of which is generally honeycombed and then covered with a smooth porous skin to minimize drag.

There are two basic problems in designing and fabricating the hulls of deep sea submergence vessels. One is to make the hull strong enough to resist the large crushing forces from hydrostatic pressure; and the other is to provide a sufficient reserve of positive buoyancy. Hulls can be made, for example, of steel or other metals, with walls thick enough to withstand the external pressures encountered in the deepest parts of the ocean; but the vessel is then so heavy that it sinks. To provide the positive buoyancy that is essential for free underwater navigation, such a hull must be attached to a flotation member, such as the petroleum filled envelope of a Trieste type submergence vessel, with resulting loss of maneuverability and increase in cost.

It is, accordingly, among the objects of the present invention to provide a hull structure for a deep submergence vessel that will have a relatively low weight for its displaced volume so as to be positively buoyant even when loaded, that will be capable of resisting hydrostatic pressures of the magnitude found at the deeper parts of the ocean without elastic instability or plastic yielding, that will permit the use of high strength, low density shell materials, including reinforced carbons and graphites, glasses and ceramics, and fiber-reinforced polymers and metals, as well as conventional metals and their alloys, and that will have low-drag characteristics when moved through the water.

The foregoing and other objects will be apparent from the following description of a preferred embodiment of the invention in connection with the attached drawings, in which FIG. 1 represents, somewhat diagrammatically, a fragmentary side elevation, partly in section, of a deep submergence vessel, showing a hull structure in the form of a load-bearing shell having a generally honeycombed exterior surface that is covered by a porous skin.

Figure 1:
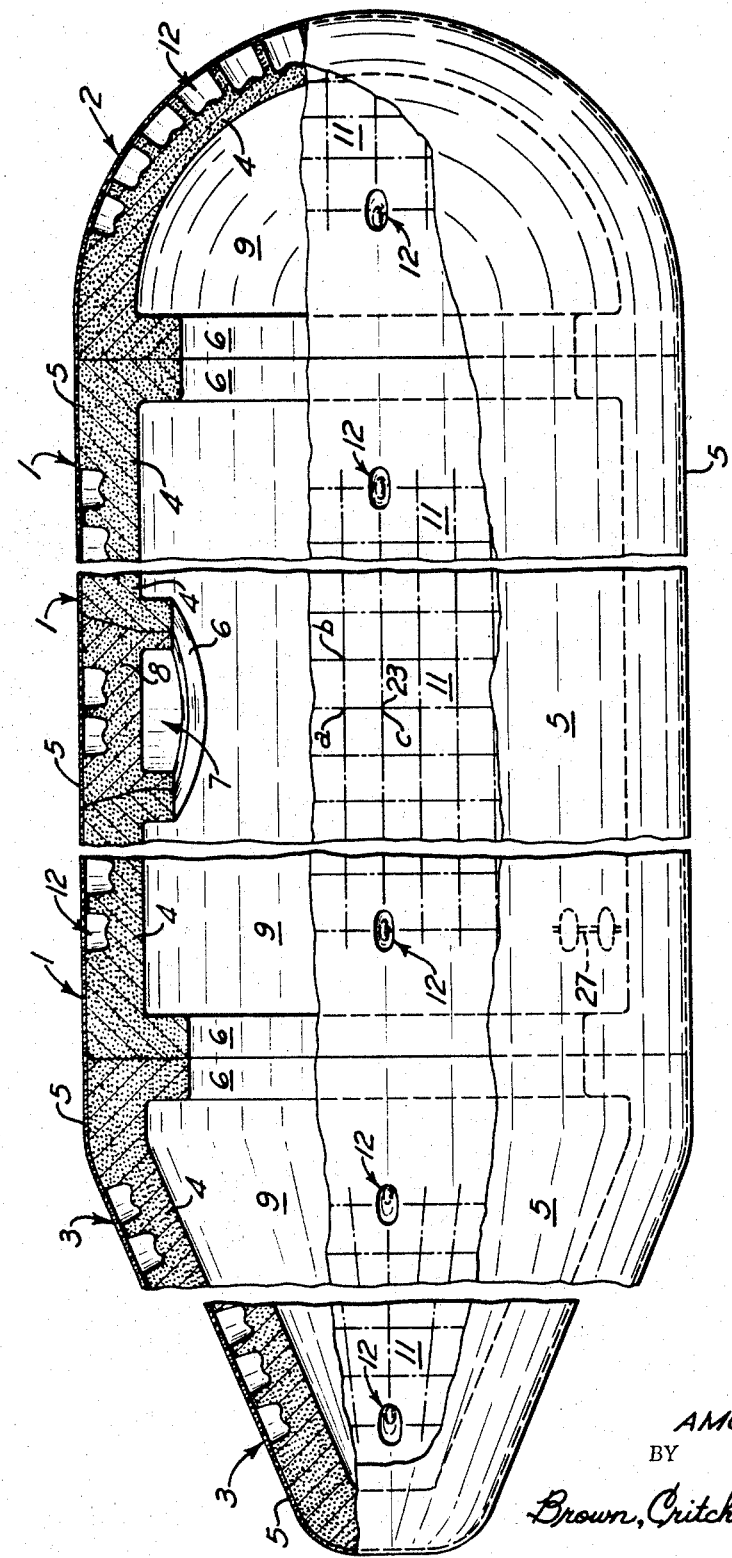

The deep submergence vessel made in accordance with the present invention comprises a hull structure in the form of a load-bearing shell having a generally smooth interior surface and a generally honeycombed exterior surface. The honeycombed surface is formed by an array of laterally spaced recesses in the outer wall of the shell. The high drag of such a shell by itself is reduced by covering it with a layer or skin of smooth porous material through which water can permeate.

Referring to the drawings, which have been simplified to emphasize the essential features of the invention, the deep sea vessel there shown has a composite hull structure of three or more longitudinal sections, consisting of one or more central cylindrical sections 1, a hemispherical bow section 2, and a conical stern section 3. Each hull section includes a load-bearing shell 4 and a porous skin 5. The shell has a substantially uniform thickness through each section, except for the integral internal annular ribs 6. The latter are desirably located adjacent the end of each section where it joins an adjacent section or is adjacent to a hatch opening 7 (which is closed by a removable hatch cover 8) in the central section. The various sections are secured together and the hatch cover is held in place by suitable conventional means (not shown) that form no part of this invention.

The load-bearing shell 4 has a smooth interior surface 9 but a honeycombed exterior surface 11 provided by an array of recesses 12, which are distributed more or less uniformly as explained below. There are no recesses, however, opposite the reinforcing ribs 6 or in the immediately adjacent regions of the shell. By arranging the recesses on the external surface 11, the shell is better able to resist buckling than if the recesses were disposed on the inner surface 9.

The recesses 12 preferably have cross sections that are elliptical (which, as used herein, includes superelliptical and other elliptical-like forms) in planes parallel to the adjacent exterior surface of the shell; but this cross section may take other geometric shapes, such as circles, squares, rectangles, regular or irregular polygons, or combinations of those shapes (the non-circular shapes preferably having rounded corners). The major diameter of each elliptical recess in the plane of the interior surface of the shell is preferably about one-half the total thickness of the adjacent shell, but may vary with different materials; and the minor diameter is about one-half the major diameter. Preferably, the major axes of these ellipses extend generally longitudinally of the shell. The depth of each recess is roughly at least one-half of the total thickness of the adjacent shell, and may vary with the spacing of the recesses relative to each other in accordance with the conditions described below. The side wall 13 of each recess preferably tapers slightly inwardly, for example, at an angle of about 5° relative to the axis of the recess, which not only permits the recesses to be moulded in the shell but also increases the resistance of the shell to failure. The bottom 14 of the recess includes a central convex portion 16, which may be a portion of an elipsoid (which, as used herein, includes superellipsoids and other ellipsoid-like forms) having major and minor diameters equal, for example, to those of the recesses in the plane of the interior surface of the shell, the ellipsoid projecting beyond the bottom about one-twentieth of its major diameter. This central convex portion is surrounded by an annular concave portion 17 that is tangent both to the convex portion and to the adjacent side wall. The advantages of the rounded bottom contours described above are that they avoid local concentrations of stress and provide additonal wall material at the center of the bottom where the stresses are greatest, thereby preventing the development, otherwise probable, of undesired tensile stresses in the outside surface of the shell over an elliptical area that roughly corresponds to the sidewall projection of the adjacent recess. In general, the curvature of the convex portion of the bottom of each recess is the greater, the smaller the elastic modulus and the density of the shell material. Also, in order that the limits of resistance of the shell shall be substantially equal in both the yielding and elastic collapse modes, the recesses are made deeper if the ratio of compressive strength to elastic modulus of the material is greater, and also if the density of the shell material is greater.

The recesses 12 are distributed over the entire exterior surface of the vessel, except in the areas 18 directly opposite to ribs 6 on the inner surface of the shell and in annular zones 19 immediately adjacent thereto where maximum strength and rigidity are desired because of the bending moments involved. The width of each recess-free zone 19 is approximately one-sixth or less of the distance between adjacent ribs on the inner surface 9 of the shell. Immediately adjacent each of these zones 19 (on the side thereof remote from the adjacent rib) is an annular transition zone 21; this, in turn, merges into an annular normal zone 22, which forms the central zone of each central section. In each of the zones 21 and 22, the recesses are distributed in a generally rectangular configuration, as indicated by the lines $ab$ and $ac$ joining the centers 23 of certain recess openings at the exterior surface of the shell (see FIG. 1). Alternatively, the recesses may be arranged in a triangular configuration in which the lines joining the centers of three vertically adjacent recesses would form preferably isoceles triangles.

Figure 2:
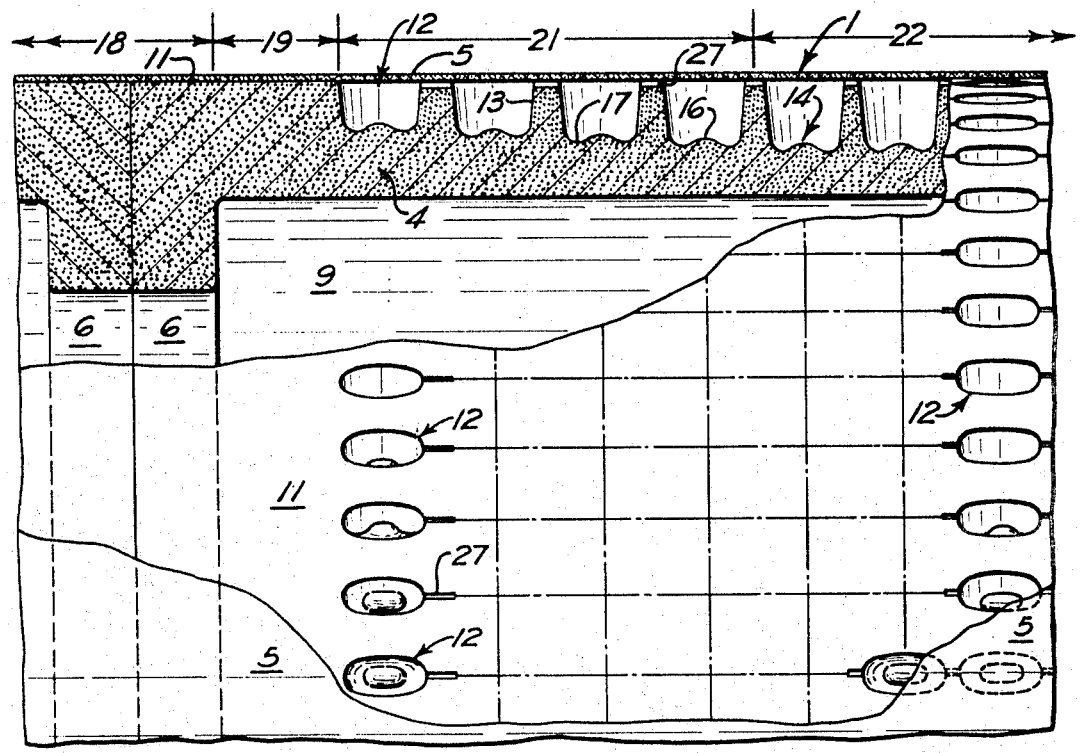
FIG. 2 is an enlarged fragmentary side view, partly in section, of a central sylindrical portion of the hull, part of which is shown in FIG. 1.
Figure 3:
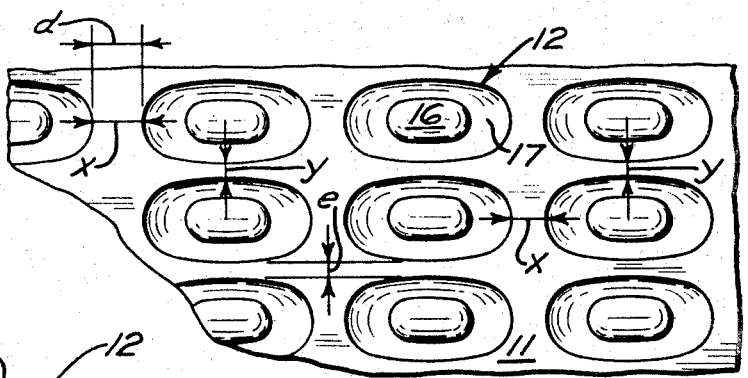
FIG. 3 is a developed, and still further enlarged, view of a portion of FIG. 2.
Figure 4:
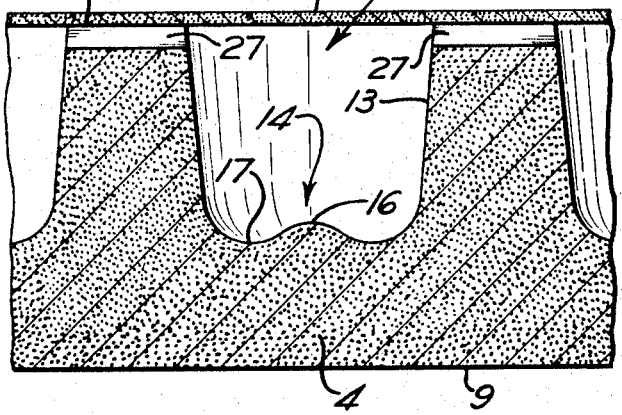
FIG. 4 is a section along the line IV—IV of FIG. 3.

In each transition zone 21, the recesses are spaced more closely in a circumferential direction than in a longitudinal direction, with the inequality becoming less towards the adjacent normal zone 22, reflecting the unequal stresses in those directions. For example, as shown in FIG. 3, the longitudinal spacing $x$ between adjacent recesses in the transition zone 21 is shown as approximately three times the circumferential spacing $y$ for those receses that are nearest the recess-free zone 19, whereas this ratio decreases to about 2 to 1 where the transition zone merges into the adjacent normal zone 22. Likewise, in each of the transition zones 21, the depth of the recesses gradually increases in a direction away from the adjacent recess-free zone 19 towards the adjacent normal zone 22, varying from approximately two-thirds to three-quarters of the depth prevailing in the latter (see FIG. 2). In each normal zone 22, the recesses are more nearly equally spaced, so that the ratios of the distances $x$ and $y$ are nearly as 2 is to 1, substantially reflecting the ratio of the circumferential and longitudinal stresses, respectively, on the shell in that region. In this connection, the unrecessed portions of the recessed zones may be considered as forming annular circumferential ribs of width $d$ and longitudinal ribs of width $e$ (see FIG. 3), the former being generally wider because the circumferential stresses are generally greater. The foregoing spacing ratio ($x:y$) may, however, be made smaller than indicated above, in fact less than unity, for vessels intended for submergence to very great depths.

Although the shell wall may be made of any suitable high-strength material, such as the common and exotic metals and their alloys, it is preferably made of high-strength, low-density materials, which may be non-metallic, as, for example, modified carbons or graphites, glasses or ceramics. If the material is initially porous, as is the case with most carbons, graphites, and ceramics, the pores may or may not be filled with another material to obtain the optimum combination of specific stiffness and specific strength according with the stability, yield, and fracture limits of the particular shell structure. For example, the shell material may be a modified carbon with a particular porosity and pore size distribution, the pores being either empty or filled in accordance with known methods by infiltration with a polymer, a salt a ceramic, a metal, other material, or a combination of these, preferably as compatible as possible with the base material with respect to its coefficient of thermal expansion and its chemical and elastic properties, so that the final specific stiffness and specific strength at points of yielding and buckling failure are at a maximum and occur simultaneously when the external hydrostatic pressure is raised sufficiently to cause failure. One advantage of using a carbon-base material modified in this manner is that the recesses may be formed in the material by isostatic pressing while in the "green carbon" state, or can be machined in later, whereas those operations are difficult to perform in glass and ceramic materials. After being formed to the desired shape, the green carbon may be baked (then, if necessary, machined) followed by infiltration as described above. Finally, in some cases, the properties of these modified carbons can be further improved by heat treating.

The preferred material for the hull structure of this invention is a high strength, high porosity carbon that has been modified by coating the walls of its pores with boron carbide directly, or by first coating its pores with boron and then heating the structure to cause the boron to react with the carbon to form boron carbide. The resulting structure consists of a carbon matrix containing an irregular network of tubiform boron carbide, analogous to polymeric or metallic materials reinforced with hollow glass filaments. Such a structure not only has a high Young's modulus of elasticity but also a high compressive strength, and yet is of relatively low density. Other infiltrants that may be used to modify the basic carbon structure includes silicon and titanium, applied, for example, by the method taught by Norman and Whalley in U.S. Patent 3,157,531. The advantages of such modified-carbon structures, over those made from straight carbides or from glass-polymer or glass-metal components, includes lower cost, higher sound-damping capacity, and machinability with attendant flexibility of design.

In this connection, it should be noted that the boron-modified carbon, or its silicon-modified or titanium-modified analogs may not only be machined to close tolerances before infiltration of the metal or metal carbide but also the later infiltration of the carbide (or of the metal and its subsequent conversion to a carbide) will not change the dimensions of the material although it may decrease the size of its pores.

Many materials can be infiltrated into the fine and highly connected pores of carbons and graphites until the available porosity is entirely filled; and, if the structure is then heated and the infiltrant is one that shrinks upon cooling, a fine even network of pores is created. In this way, it is possible to control the final porosity of the structure. Thus, for example, if boron is infiltrated into a porous carbon, the resulting structure will consist of a highly complex, non-directional network of multiply-connected tubes of boron inside the original pores of the carbon. If the structure is then heated, the boron can be carburized, accompanied by additional shrinkage, until the desired porosity and mechanical properties are obtained. Impermeability to water may then be obtained by an additional infiltration to fill the pores, or by one that will merely coat the remaining pore walls with a hydrophobic substance, thus excluding water but permitting the exchange of gases, such as oxygen and carbon dioxide, between the interior of the vessel and the sea water.

To avoid the drag that would otherwise encumber a hull with external recesses, the outside of the shell 4 is covered with a smooth porous skin 5. Its porosity permits water to flow therethrough, so as to equalize the pressure on both sides of the skin across the base of the recesses, where the skin would otherwise be deformed or dimpled inwardly by the high external pressure.

The porous skin 5 may be made from a variety of material, including metals into which slots or holes have been cut, or sintered metals that are inherently porous. Examples of the latter are disclosed in the U.S. patent to Giles, No. 2,969,759. An improved porous skin can be made, however, from high strength, high porosity carbon that is modified by coating the walls of its pores with boron carbide (or other carbides) directly, or indirectly, as described above. This modified carbon material not only has the advantages previously described in connection with the load-bearing shell, but also, and more importantly when used as the skin 5, it retains a connected porosity that may be as high as 15 percent. In other words, it has a water permeability sufficient to establish pressure equilibrium on either side of the skin when applied to an exteriorily recessed shell, and also to permit boundary layer control of the surrounding water by suction applied to the inner surface of the skin, in the manner disclosed, for example, in the Giles patent referred to above, and finally to provide a degree of autonomic boundary-layer control as taught, for example, by Boggs in U.S. Patent 3,051,599, since, so long as water can enter the pores, the boundary-layer pressure can nowhere exceed that necessary to overcome the bulk modulus of water, which is much less than that of the shell material itself. When intended for boundary layer control, the shell 4 may have grooves 27 in its outer surface to provide flow channels between recesses 12. In addition, means (not shown) of the type described in the Giles patent would be used to suck water through the skin into the recesses, then from one recess to another through the grooves, eventually to discharge it at the stern of the vessel.

Still another advantage in using such modified carbon materials as a porous skin is that its pores are of a size that is not likely to become clogged in sea water. Investigation by others of the distribution of particulate matter in sea water indicates that a substantial portion of it has diameters that will easily clog filters whose openings are from five to a few hundred microns in diameter, while another class of marine particles present in substantial quantity in sea water will pass easily through such filters. If, however, the filters have openings smaller than 0.5 micron, particles of the second group are trapped and cause clogging; but the particles larger than 5 microns do not clog the filter, since they do not tend to adhere to what appears to them to be a polished surface. On the other hand, if the filter openings have diameters between 0.5 and 5 microns, the particles of the second group pass through, and those of the first group do not clog the openings. For example, it has been shown that over 0.01 gram (dry weight) of particulate material can be collected on filters having openings of 5 microns, in a certain period of time, and also that about the same amount may be collected on filters having openings of 0.4 micron, but only 0.001 gram, or ten times less, on filters having openings of between 1 and 4 microns. It is a feature of this invention that the pores in the infiltrated skin material through which boundary-layer water is desired to pass are made to have diameters predominantly in the range of from 1 to 5 microns.

A material such as the boron-carbide-modified carbon described above can be made with substantially all its porosity in the desired dimensional range, and the ability to obtain this pore-size distribution is one of the advantages of using such a material for the porous skin 5.

Another advantage is that this material can be highly polished everywhere on the external surface except, of course, where the pore openings are, thereby to reduce to a minimum the disturbance of the sea water boundary-layer by roughness.

According to the provisions of the patent statutes, I have explained the principle of my invention and have illustrated and described what I now consider to represent its best embodiment. However, I desire to have it understood that the invention may be practiced otherwise than as specifically illustrated and described.

I claim:
1. A deep sea submergence vessel for resisting high external fluid pressure, comprising an enclosed load-bearing shell having a generally honeycombed exterior surface and a generally smooth interior surface, the honeycombed surface being in the form of an array of laterally spaced recesses opening on said exterior surface, and a porous skin covering said exterior surface and the openings of the recesses therein to reduce the drag resistance of the vessel and to permit the surrounding fluid to permeate through the skin.

2. A vessel according to claim 1, in which both the shell and the skin are made of a porous modified carbon material.

3. A vessel according to claim 2, in which the carbon material is modified by infiltrating into the pores thereof an element in the group consisting of boron, silicon, and titanium, and also modified by the subsequent carburization of that element by thermal reaction with a portion of the adjacent carbon.

4. A vessel according to claim 3, in which the shell is rendered impermeable to water by filling the remaining pores with a polymeric material.

5. Apparatus according to claim 3, in which the shell is rendered impermeable to water by coating the walls of the remaining pores with hydrophobic material.

6. A vessel according to claim 2, in which the carbon material is modified by infiltrating into the pores thereof a carbide of an element in the group consisting of boron, silicon, and titanium.

7. A vessel according to claim 2, in which the pores of the material forming the skin have diameters predominantly in the range of between 1 and 5 microns.

8. Apparatus according to claim 1, in which the skin is formed of a carbon base material, the pores of which are infiltrated with boron that is reacted thermally with a part of the adjacent carbon to form a boron carbide layer adhering to the pore walls, and in which the predominant portion of said pores have diameters ranging from 1 to 5 microns.

References Cited
UNITED STATES PATENTS

| | | | |
|---|---|---|---|
| 3,280,775 | 10/1966 | Krenzke | 114—16 |
| 3,329,297 | 7/1967 | Jordan | 114—16 X |

TRYGVE M. BLIX, *Primary Examiner.*

U.S. Cl. X.R.

220—83